United States Patent Office 3,481,754
Patented Dec. 2, 1969

3,481,754
CARBON BLACK OXIDATIVE HEAT TREATMENT
William H. Lewis, Franklin, La., and Joe Y. Rogers, Jr., Pampa, Tex., assignors to Cabot Corporation, Boston, Mass., a corporation of Delaware
Continuation-in-part of application Ser. No. 481,542, Aug. 23, 1965. This application Dec. 19, 1968, Ser. No. 786,841
Int. Cl. C09c 1/56
U.S. Cl. 106—307          6 Claims

ABSTRACT OF THE DISCLOSURE

An improved process is provided for the art-recognized oxidative treatment of carbon blacks wherein carbon black is heated in the presence of an oxidant. Broadly, the improvement comprises the use of radiant infrared heat to provide the predominant amount of heat energy required to heat the carbon black to the desired oxidation temperature. By accomplishing the heating of the black in this manner substantial economic and process efficiency advantages are gained.

CROSS REFERENCES TO RELATED APPLICATIONS

This application is a continuation-in-part of our application Ser. No. 481,542, filed Aug. 23, 1965, now abandoned.

SUMMARY OF THE INVENTION

Carbon black as it is usually produced contains a small amount of volatile matter. For example, black produced by the channel method often contains about 3 to 6% or more of volatile matter (as determined by ASTM D–1620–60). For many purposes wherein carbon black may be used, the advantages of its use are considerably enhanced by the addition of larger amounts of volatile matter. For instance, higher volatile content improves color, gloss, and tone, and increases viscosity stability in lithographic inks, paints and enamels.

Freshly produced furnace blacks, on the other hand, normally have volatile contents of about 1 percent or even less. Such furnace blacks, while often displaying excellent reinforcing properties in various rubber applications, are nevertheless often hindered in such applications by their "scorchiness," i.e. their tendency to cause rubber stocks to cure or vulcanize prematurely. Accordingly, such furnace blacks are often treated by way of an oxidizing heat treatment which lowers their pH (ASTM D 1512–60) and thus confers a substantial reduction in their normally scorchy nature while retaining their good rubber reinforcement properties. Again, however, the reduction in pH of furnace blacks undergoing oxidative heat treatments is signalled by an increase in volatile content thereof.

The addition of volatile matter and/or lowering of pH of a carbon black is usually carried out by heating the black in the presence of an oxidant such as nitric acid, air, nitrogen oxides, chlorine, ammonium nitrate, sulfur chloride, hypochlorous acid, etc. to temperatures of between about 65° C. and about 1200° C. or even higher in some instances. At temperatures of substantially above about 1000° C., e.g. 1200° C., the black is often calcined, i.e. volatile constituents are often removed rather than added. For some grades, the heat treatment is also used to improve color properties while simultaneously adding volatiles. A more detailed understanding of various oxidative carbon black heat treatment processes can be had by reference to such patent literature as: U.S. 2,013,774, Weigand, Sept. 10, 1935; U.S. 2,420,810, Bray et al., May 20, 1947; U.S. 2,516,233, McKinnis, July 25, 1950; U.S. 2,641,535, Cines, June 9, 1953; U.S. 2,657,117, Sperberg, Oct. 27, 1963; U.S. 2,686,107, Jordan, Aug. 10, 1964; U.S. 3,226,244, Jordan et al., Dec. 28, 1965; U.S. 2,013,775, Weigand, Sept. 10, 1935; U.S. 3,279,935, Daniell et al., Oct. 18, 1966; U.S. 3,301,694, Kraus et al., Jan. 31, 1967; U.S. 3,318,720, Johnson et al., May 9, 1967; U.S. 3,398,009, Deery, Aug. 10, 1968.

A number of problems are often met in carbon black oxidative heat treating processes of the above-described types. These problems include substantial loss of carbon black by oxidation thereof and by dust transported by turbulence or convection currents. Some of the aforesaid losses due to oxidation are inherent to such processes, since the heat treatments are more precisely characterized as controlled partial oxidation processes which are carried out in an environment conductive to surface oxidation of the carbon black particles undergoing treatment. However, in addition to such desirable partial or surface oxidation of the carbon black particles, there is further known to occur in prior art oxidative heat treatment processes varying amounts of parasitic total oxidation due to localized hot spots, excessive retention of the carbon black bed within the heated zone, etc. Those losses which are due to turbulence are normally, in large measure, a result of convective gaseous currents set up by the burning of a fuel gas and air which current are conveyed into the treater apparatus and tend to fluidize or "dust" the black contained therein. Furthermore, life of the equipment in which the heat treating operation has been carried out heretofore is considerably shortened, and maintenance of this equipment is subject to the same corrosive and thermally stressful environment to which the black is subjected.

Moreover, the open trough type apparatus presently used for such heat treating processes includes a very large quantity of expensive fire brick used to form an oven-like arrangement for containing heat which brick is slow to warm up and slow to cool off. Warm-up and cooling time affects the efficiency of the heat treating operation by reducing the time during which product of good quality can be produced and reducing the efficiency with which fuel can be utilized.

OBJECTS OF THE INVENTION

Therefore it is a principal object of the present invention to provide a novel and efficient process for the oxidative heat treating of carbon black.

It is another object of the invention to provide a process for the production of oxidatively heat treated carbon black which process is subject to less downtime than processes previously used.

It is another object of the invention to provide a process for the oxidative heat treatment of carbon black which process may be efficiently operated with considerably less utilization of fuel per unit product than has been previously known in the art.

It is a further object of the invention to provide a process and apparatus for the oxidative heat treatment of carbon black which results in considerably less carbon black lost through total oxidation or by dusting than has been lost in prior art processes and apparatus.

Other objects of the invention are in part obvious and in part pointed out hereinafter.

BROAD DESCRIPTION OF THE INVENTION

Applicants have substantially met the foregoing objects by providing an oxidative heat treating process in which radiant energy is utilized as the predominant source of energy in the heat treatment of carbon blacks. Such heat treatment can be carried out at temperatures of between about 65° C. and about 1000° C.; however, treatment temperatures of between about 70° C. and about 550° C. will normally be preferred. The increases in volatile content of the black experienced by adherence to treatment at the above-mentioned temperature ranges will be affected, to a large extent, by the time of treatment, the particular oxidant utilized, etc. Generally speaking, however, the volatile content of the particular subject black will be increased by at least about 15 percent and can be as high as 500 percent or even higher than the original volatile content of the black prior to said treatment.

In the instant specification and in FIGURES 1–3 hereof, a preferred embodiment of the apparatus and process of the invention is shown and described. A number of alternatives and modifications thereof are suggested, but it is to be understood that these are not intended to be exhaustive and other changes and modifications can be made within the scope of the invention. The suggestions herein are selected for the purposes of illustration in order that others skilled in the art will more fully understand the invention and the principles thereof and will be able to modify it and embody it in a variety of forms each as may be best suited to the conditions of a particular case.

THE DRAWINGS

DETAILED DESCRIPTION

Figure 1:
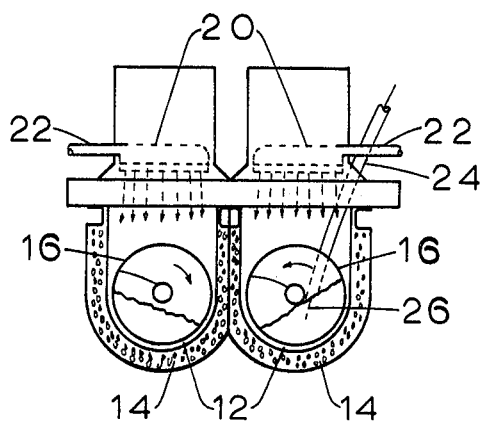
FIGURE 1 is a section in elevation of apparatus useful in carrying out the invention.

FIGURE 1 shows two conveyor troughs 12 mounted side by side. Each trough is covered with two inches of fiberglass insulation 14 shielded with aluminum sheet. Inside trough 12 are screw conveyors 16 and a supply of carbon black 26 therein being subjected to heat treatment. Above screw conveyors 16 are mounted gas fired infrared heating units 20. These heaters are so arranged that the infrared rays emanating therefrom fall upon carbon black 26 in troughs 12. Gas is supplied to the heaters from gas supply lines 22a and 22b. A thermocouple well 24 is inserted into a trough and a thermocouple 26 is inserted into the well. The well is preferably of the thin-walled type in order to allow quick thermal response of thermocouple 26 as well as protecting said thermocouple from direct radiant heating.

Figure 3:
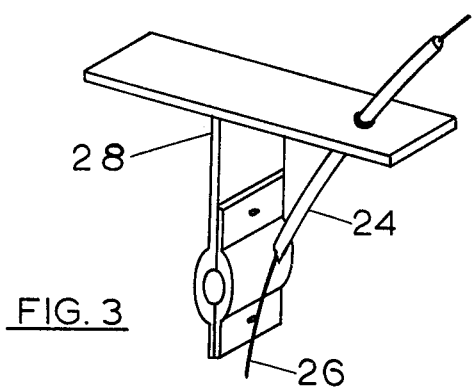
FIGURE 3 is a perspective view showing a convenient mounting of thermocouples for use in the process of the invention.
Figure 2:
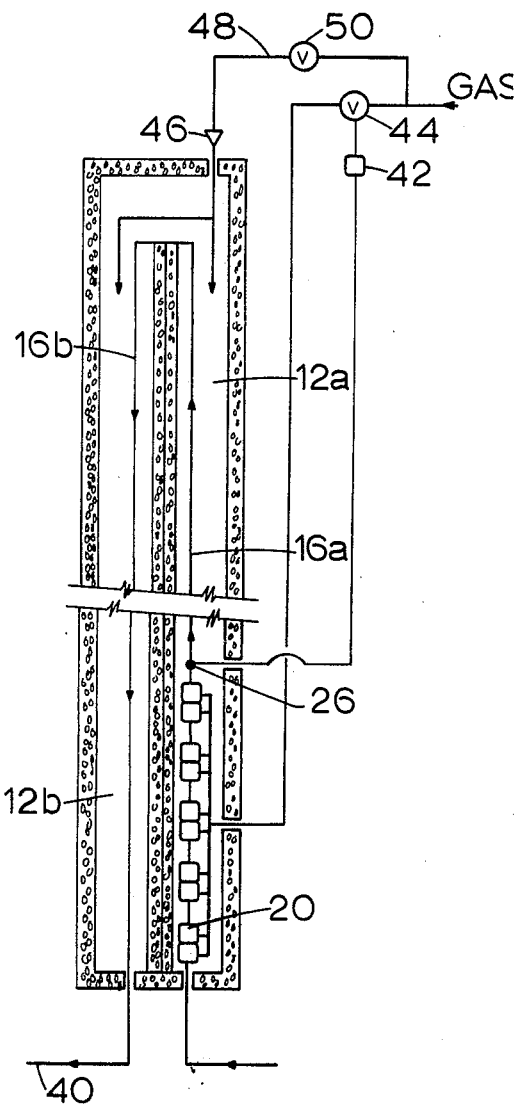
FIGURE 2 is a schematic diagram of a heater control circuit indicating one method of operation of the apparatus of FIGURE 1.

Referring to FIGURE 2, it is seen that there are ten burners 20, each comprising three infrared heaters of 12,000 B.t.u.'s per hour heating capacity and therefore having a total capacity of 36,000 B.t.u.'s per hour per burner. Each set of ten burners is mounted over a nine foot longitudinal zone of a 45-foot long trough section such as shown in FIGURE 1. Five such sections through which the carbon black is sequentially passed are utilized; however, for purposes of clarity, only one such section is shown in FIGURE 2. Bearing hangers 28, shown in FIGURE 3, are placed in the spaces between each pair of heaters 20. Carbon black is fed into trough 12b upstream from the first of infrared heaters 20 and is exited from the treater apparatus at outlet 40 of trough 12b. The temperature of the black within each heated zone is monitored by a thermocouple 26 and the sensed temperatures are then recorded on recorder-controller 42. Controller 42 operates pneumatic valve control 44 to control the gas supply to infrared heaters 20 of each zone being monitored as required to maintain the desired temperature of a particular zone. The pilot gas supply is supplied to a gas mixer 46 through pilot gas supply line 48 which provides pilot gas to all zones of the apparatus. The gas is allowed into line 48 through manually operated valve 50.

Although, for simplicity and clarity of presentation, only a single thermocouple/temperature recorder-controller has been shown in FIGURE 2, it is to be understood that preferably there is provided a separate temperature recorder-controller for each operating zone. Each said temperature recorder-controller thereby provides means for selectively adjusting the amount of heat being directed at the carbon black in each of said zones as it passes therethrough.

Figure 4:
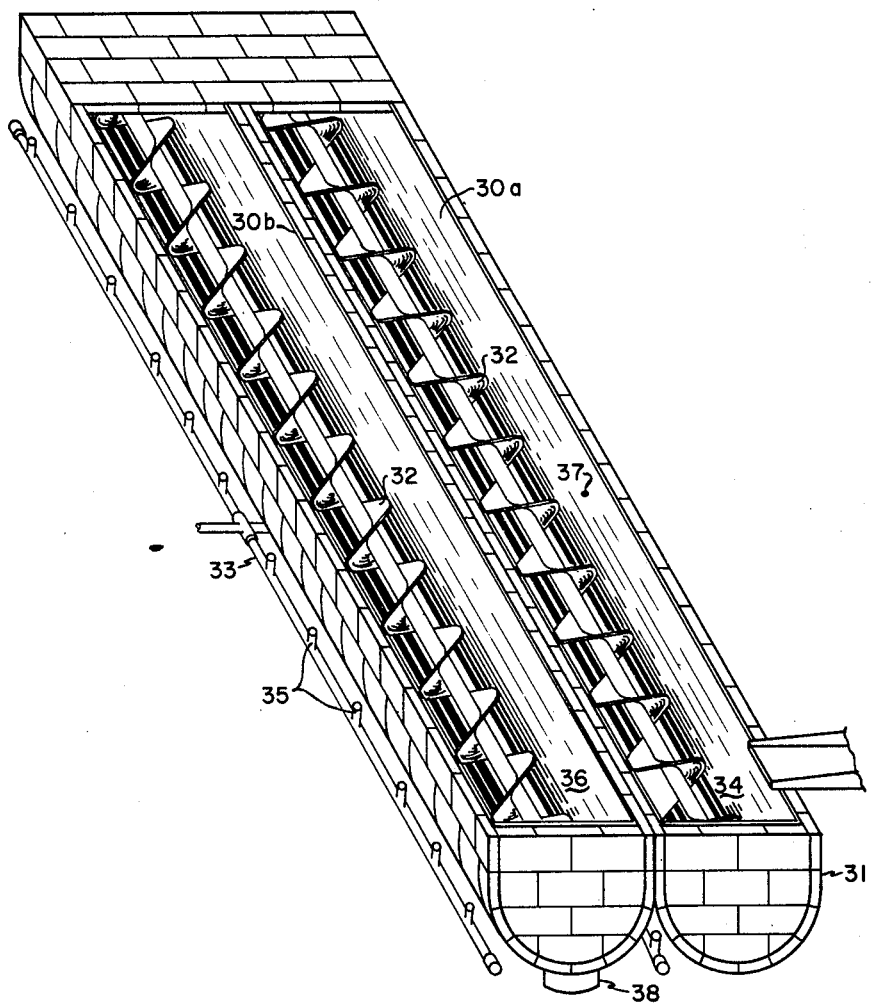
FIGURE 4 is an isometric schematic view of a typical open trough treater apparatus of the type generally employed in the prior art.

The materials of construction of the troughs and conveyor screws may be selected from a large number of materials known to the art. Mild steel is normally a suitable material. However, in order to obtain the highest degree of efficiency from the infrared heat input, it is advantageous to utilize materials having a more reflective surface. Furthermore, when highly corosive oxidants such as nitric acid are to be utilized, it should be borne in mind that corrosion resistant materials, such as stainless steels, are preferred materials of construction. In a similar vein, where the oxidant to be utilized is toxic or corrosive or where the by-products of the oxidation process are toxic or corrosive, the heat treatment process may be carried out in a substantially totally enclosed zone. For instance, referring to FIGURE 1, a glass cover (not shown) can be interspersed between troughs 12 and infrared heating units 20. Said cover can be disposed in such a manner as to provide a substantially completely enclosed treatment zone. Nevertheless, the glass permits the infrared heat output of the units to penetrate therethrough onto the black undergoing treatment. Obviously, such a design expedient provides a solution for the dusting losses previously encountered in oxidative treatments heretofore carried out in open trough treater apparatus such as shown in FIGURE 4. Of even greater significance, however, is the fact that the heat exchange effected between the infrared heating unit(s) and the black is substantially totally indirect and the environment within the enclosed treatment zone is unusually free from adulterants as well as being readily and precisely controllable.

Suitable thermocouples are usually of the iron/constanttin type. This type is entirely adequate for the temperatures most often involved although it is most desirable that they be proected by a thin wall thermocouple well. A thin wall well normally confers sufficient physical and radiant heat protection for the thermocouple and, additionally, allows quick response to temperature changes in the mass of carbon black being processed.

Specific gas fired radiant heaters which are readily adaptable for use in the present invention are those manufactured by Perfection Industries Division of Hupp Corporation and sold under the trade designations Model JS2 of Mode PJ542AL. Numerous other fueled or electric radiant heaters can be used as will be obvious to those skilled in the art. The aforesaid specifically mentioned radiant heaters are comprised of ceramic mats mounted on a cast iron burner housing. Fuel gas entering the burners and the necessary air admitted thereto are combusted together at the outside surface of the ceramic mat. The temperature of the ceramic mat reaches approximately 870° C. and this temperature is reached in a few moments of operation. The larger part of the infrared heat radiated from the aforesaid heaters falls within the wave length range of 1.5 to 6.0 microns. Substantially no ultraviolet wavelengths are usually generated by these heaters, although it is believed that the generation of such ultraviolet light would not normally be harmful in the process of the invention.

There follow a number of illustrative non-limiting examples:

Example 1

A conventional carbon black open trough screw conveyer treating apparatus is utilized substantially as shown in FIGURE 4. Said apparatus comprises a screw conveyer system consisting of two cast steel troughs 30a and 30b, each about 45 feet in length and disposed in side by side relationship. Conveyor screws 32 are positioned axially within said troughs 30 and are rotated by external power (not shown) in a manner such that carbon black fed into end 34 of troughs 30a is urged along the length thereof, into neighboring trough 30b and through the length of said trough wherein, at end 36 thereof, it is discharged through outlet 38. Said troughs 30a and 30b are insulated by firebrick insulation 31 having a thickness of about 4 inches. Heating of said troughs is achieved by supplying fuel gas through manifold 33 to burner tips 35 disposed beneath troughs 30. Said fuel gas is ignited at each of burner tips 35 and the resulting flames impinge upon firebrick insulation 31 at the bases of the troughs.

The apparatus described above is preheated by combusting natural gas at the burner tips at a rate of about 6 M c.f.h. for about twelve hours. The cost of said fuel gas at the site of operation was $.18/M c.f. At the end of this preheating step the temperature within the troughs was determined to be about 1650° C. Next, a channel black having a volatile content of about 5% (ASTM D–1620–60) was charged into end 34 of the treater apparatus at a substantially constant rate of about 105 lbs./hour and screws 32 were operated at an appropriate speed to provide a substantially constant carbon black bed depth within troughs 30a and 30b. The total length of the run was 48 hours during which period the carbon black products was continuously collected from outlet 38. Ambient air was utilized as the oxidant material and, during the course of the run, the combustion fuel gas rate was maintained at about 6 M c.f.h. The temperature of the carbon black bed was taken periodically at various locations along each of the troughs 30. Said temperature was found to remain relatively constant at about 540° C. (± ~ 20° C.) from about midpoint 37 of the trough 30a to discharge end 36 of trough 30b. However, the temperature of the carbon black bed at any given location prior to said midpoint 37 was found to vary considerably (± ~ 100° C.), i.e. during the heating of the black to operating temperatures.

The collected product was weighed and tested for volatile content and it was found that about 3,800 lbs. of product having a volatile content of about 13.0 percent had been produced. The product black was then tested in various lithographic, letterpress and typewriter ink formulations and it was found to express good jetness and long flow properties therein.

Example 2

This example is essentially a duplicate of Example 1 with the exception that the infrared heating technique of the present invention was utilized. Accordingly, the apparatus of FIGURE 4 was modified to substantially the same design criteria as shown in the apparatus of FIGURES 1 and 2 and described in detail hereinbefore. The infrared heaters were placed in operation at a total natural gas consumption rate of about .25 Mc.f.h. and, within about 15 minutes from the start-up of said burner, raw channel black was treated within the confines of the apparatus at the same throughput (105 #/hour) as utilized in the control run of Example 1. During the course of operations the temperature of the channel black bed was determined at various locations along the treater troughs and it was found that said black attained an unusually uniform temperature of about 510° C. Further, it was found that said temperature was achieved substantially more quickly during the traverse of the block through the treater troughs than had been accomplished during the control run of Example 1; i.e., in the instant run, the black bed attained said temperature at a point only about 9 feet downstream from inlet end 34 of trough 30a.

After about 48 hours the treater operations were shut down, the treated black collected, weighed and analyzed for volatile content. It was found that about 4,300 pounds of black product having a volatile content of about 14 percent had been produced and collected. The product black was then tested in various applications in the same manner as the black of Example 1 and it was found that the instant black product was, in all respects, the substantial equivalent of the treated black of Example 1.

A compilation of pertinent data extracted from the oxidative heat treatment of this example and a comparison thereof to that of Example 1 can be found in the table following:

TABLE

| | Volatile content of product (percent) | Product recovery (wt. percent of total input) | Operational fuel gas consumption (M c.f.) | Operational fuel gas cost at $.18/ M c.f. | Start-up fuel consumption (M c.f.) |
|---|---|---|---|---|---|
| Ex. 1 | 13 | 80 | 288 | $52.04 | 72 |
| Ex. 2 | 14 | 90 | 12 | 2.16 | .063 |

It is also noteworthy that the amount of fuel required in start up operations utilizing the process of the present invention is markedly lower than that required in the prior art process as described in Example 1. Thus, economic advantages over and above even those explicitly shown in the above table are available to the practitioner of the instant process.

Example 3

A glass treater apparatus is provided which consists of a heat resistant glass tube of about 48 inches in length and an I.D. of about 3.8 inches. Said tube is supported at each end and is provided with means for rotating it about its axis. The entire structure is mounted such that the tube maintains an angle of about 3° from the horizontal. Gas fired infrared heating units, each about 3" wide and about 6" in length are oriented along the length of the tube and are maintained at a stand-off distance of about 1" from the exterior surfaces thereof. The tube is then rotated at a rate of about 5 r.p.m. and said units are thereafter ignited. The total fuel consumption thereof is monitored. Within about a minute of said ignition there is charged at a continuous rate into the higher end of the rotating tube about 750 grams per hour of a pelleted oil furnace carbon black having a volatile content of about 1.5 percent. Additionally, there is charged into the carbon black pellet feed about 45 grams per hour of 70 percent nitric acid. The temperature of the black was determined at about the midpoint of the glass tube treater and was found to be about 75° C. At the discharge end of the treater the black temperature was found to be about 145° C. The product black is collected and analyzed and is found to have a volatile content of about 3.8 percent, i.e. an increase of about 160 percent above the original volatile content thereof. When the above procedure is repeated with the exception that a plurality of bunsen burners equipped with fan tips are utilized as the heat source and the flames issuing therefrom are impinged directly on the exterior of the glass treater tube it is discovered that substantially more fuel gas is required to gain the same level of oxidative heat treatment as achieved during the use of the infrared heating units.

In addition to the advantages of the invention which are explicitly set forth above and which are listed as objects of the invention, a number of other advantages have been found to be attained by the apparatus of the invention and the process utilizing this apparatus. For example, although some decrease in fuel consumption was envisaged as a result of the use of infrared heat as the predominant source of heat energy, it was totally unexpected that the fuel consumption of the instant process in Examples 1 and 2 would represent only about 5% of the fuel consumption formerly necessary to achieve an equivalent level of oxidative heat treatment of a particular carbon black. Note too that this figure does not include start-up fuel in which the present process also displays marked economic and process superiority. Furthermore, large quantities of carbon black which formerly escaped from the troughs as dust or smoke are now retained therein because it is possible to operate the process of the invention in an enclosed trough or zone. Moreover, because the black processing temperature can be much more easily precisely controlled by the process of the invention, quality control is enhanced.

What is claimed is:

1. In a process for the oxidative treatment of carbon black which comprises moving said black through a heated zone and contacting the black therein with an oxidant at a temperature of between about 65° C. and about 1000° C., thereby promoting a partial oxidation of the black to the extent that an increase in volatile content of between about 15 and about 500 percent is realized based on the original volatile content of the black prior to such treatment, the improvement which comprises providing at least a major proportion of the total heat energy necessary to bring said black to the desired partial oxidation temperature by impinging infrared radiation onto the black moving through said zone.

2. The process of claim 1 wherein said black is heated to between about 70° C. and about 550° C.

3. The process of claim 1 wherein said heated zone comprises a purality of independently controlled infrared radiant heating zones and the temperature of the carbon black in each of said zones is controlled as the black is progressively and serially moved therethrough.

4. The process of claim 1 wherein said oidant is air.

5. The process of claim 1 wherein said oxidant is chosen from the group consisting of nitric acid and nitrogen oxides.

6. The process of claim 1 wherein said heated zone is substantially entirely enclosed and separate from the source of said infrared radiation.

References Cited

UNITED STATES PATENTS

| 1,839,515 | 1/1932 | Wetherbee. |
| 1,851,745 | 3/1932 | Wetherbee. |
| 2,707,672 | 5/1955 | Sweitzer. |
| 2,707,674 | 5/1955 | Sweitzer. |
| 3,155,142 | 11/1964 | Stack. |
| 3,188,366 | 6/1965 | Flynn. |

OTHER REFERENCES

Hall: Industrial Applications of Infrared, 1st edition, McGraw-Hill, New York, 1947, pp. 13–23, 179–182.

TOBIAS E. LEVOW, Primary Examiner

H. M. S. SNEED, Assistant Examiner

U.S. Cl. X.R.

23—209.1